United States Patent [19]

Seragnoli

[11] 4,287,797

[45] Sep. 8, 1981

[54] DEVICE FOR FEEDING AND ADJUSTING A CONTINUOUS WEB AND FOR CUTTING IT INTO PORTIONS

[75] Inventor: Enzo Seragnoli, Bologna, Italy

[73] Assignee: G.D. Societa per Azioni, Bologna, Italy

[21] Appl. No.: 103,281

[22] Filed: Dec. 13, 1979

[30] Foreign Application Priority Data

Dec. 22, 1978 [IT] Italy ................................ 3634 A/78

[51] Int. Cl.[3] ........................ B26D 5/34; G05B 19/29

[52] U.S. Cl. ............................................ 83/74; 83/76

[58] Field of Search ............................... 83/74, 75, 76

[56] References Cited

U.S. PATENT DOCUMENTS

| | | | |
|---|---|---|---|
| 3,055,246 | 9/1962 | Steinberg | 83/74 |
| 3,276,647 | 10/1966 | Lewis | 83/74 X |
| 3,468,201 | 9/1969 | Adamson | 83/74 |
| 3,620,111 | 11/1971 | Bosshard | 83/74 |
| 3,688,620 | 9/1972 | Harris | 83/74 |
| 4,020,406 | 4/1977 | Tokuno | 83/74 |

*Primary Examiner*—J. M. Meister

*Attorney, Agent, or Firm*—Frost & Jacobs

[57] ABSTRACT

A device for feeding, adjusting and cutting a continuous web in predetermined zones to obtain portions is described. The device comprises periodically cutting apparatus, apparatus for feeding the web to said cutting apparatus, and a device for detecting at least one reference mark for the zone on the web. The main characteristic of the device is to comprise first device for checking the position of the predetermined cutting zone relative to a cutting apparatus and to quantify any diversity between the two zones, and second apparatus driven by the first device for controlling and correcting any diversity relative to each portion cutting operation, to act on the feed device and/or on the cutting apparatus in order to eliminate any diversity relative to each portion cutting operation.

8 Claims, 7 Drawing Figures

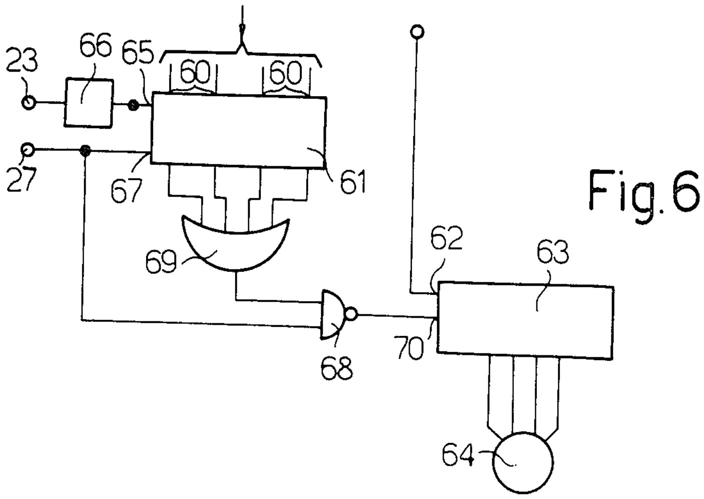
Fig. 6
Fig. 7
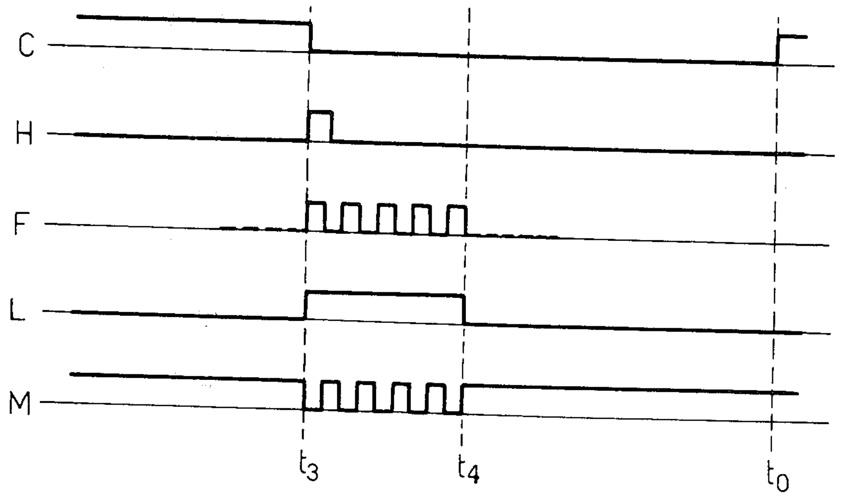

DEVICE FOR FEEDING AND ADJUSTING A CONTINUOUS WEB AND FOR CUTTING IT INTO PORTIONS

BACKGROUND OF THE INVENTION

This invention relates to a device for feeding and adjusting a continuous web and for cutting it into portions, and in particular a web on which is printed a plurality of motifs which have to be centred precisely and always identically on each portion which is cut.

In order to obtain good constant centering of the printed motif on each portion, an adjustment operation has to be carried out before the cutting operation.

In this respect, it is well known that the distance between the centres of printed motifs on a continuous web is not exactly constant for various reasons deriving from the actual printing process, from the variation in the tension to which the web is subjected during its unwinding, and from variations in ambient conditions which can cause it to contract or elongate.

For these reasons, when a web printed on one or both of its faces has to be divided into portions, each cutting operation is of necessity preceded by an operation in which the position of the printed motif is checked, which is followed if necessary by an adjustment operation. By means of these operations, portions are obtained which, although they may not be of precisely constant length, carry on their surface printed motifs which are perfectly centred.

For this purpose, according to the known art, reference marks (colour marks, holes, slots) are provided on the continuous web during its printing and at the same distance apart as the printed motifs, such as to correspond with each length which is to constitute an individual portion. The checking and adjustment operation is therefore carried out using these marks for reference purposes.

Some of the known devices therefore comprise means for feeding the web, constituted by rollers which are driven intermittently to unwind, during each cycle, a length of web which is approximately equal to but greater than the length of one portion. As the reference mark passes through its reading zone, a photoelectric cell provides a signal. If this signal is in synchronism with a second signal generated by a cyclic machine cam in fixed phase relationship with the periodic cutting means, this signifies that it is not necessary to adjust the web before the cutting operation. If said signals do not coincide, then an adjustment operation is necessary.

In these known devices, because of the fact that the cyclic feed is excessive by an amount greater than any variation in the distance between the reference marks, a phase displacement between the two signals occurs after a certain number of cycles starting from a condition of perfect adjustment, and more precisely the photoelectric cell reading signal occurs before the signal provided by the cyclic machine cam. At this point, there is automatic energisation of an electromagnet, which, by way for example of deviation rollers over which the web runs, resets the adjustment by dragging the length of web lying between the cutting device and photoelectric cell through a predetermined fixed distance in the direction opposite the direction in which the web runs.

This system, which is based on the condition of having centering errors always of the same sign, and which can thus be corrected by a simple electromagnet, has however the drawback of limited accuracy. In practice, there is continuous oscillation of the effective cutting line about its ideal position, thus always determining a certain centering error, even though minimal, for each portion.

In addition, in devices of the described type, the adjustment errors must be detected in proximity to the cutting line, and preferably not more than one pitch upstream of the cutting means. If not, then because of the pitch variations between one motif and the next, and thus between the reference marks, any adjustment operation which is carried out a certain number of pitches or portions upstream of the cutting means can give rise to an incorrect centering of the printed motifs on the individual portions. In other words, under such operating conditions, the known described device detects a centering error relative to a certain reference mark but makes its correction relative to a reference mark which is different from the former.

SUMMARY OF THE INVENTION

One object of the present invention is to provide a device for feeding and adjusting a continuous web and for cutting it into portions, which overcomes the drawback of limited accuracy of known devices, and is thus able not only to detect adjustment or centering errors, but is also able to quantify such errors and to correct them for each individual portion.

A further object of the present invention is to provide a device for feeding and adjusting a continuous web and for cutting it into portions, which is able to take account of the pitch variations between one motif and another, i.e. a device in which means for detecting the reference marks can be fitted according to requirements or according to space availability in any position along the path of the continuous web.

Further objects and advantages of the device according to the present invention will be apparent from the description given hereinafter.

The present invention therefore provides a device for feeding and adjusting a continuous web and for cutting it into portions, said portions to be cut in a predetermined zone on said web, said device comprising means for periodically cutting in accordance with operational cycles which correspond to the formation of a portion of said web, means for feeding said web to said cutting means, and means for detecting at least one reference mark for said zone on said web, comprising first means for checking the position of said predetermined cutting zone relative to a cutting zone consequent on the action of said cutting means and to quantify any diversity between said two zones, and second means for controlling and correcting said any diversity relative to each portion cutting operation, arranged to directly or indirectly receive signals from said first means as a function of said any diversity, and to act on said feed means and/or said cutting means in order to eliminate said any diversity relative to each portion cutting operation.

BRIEF DESCRIPTION OF THE DRAWINGS

The present invention will be more apparent from the description given hereinafter by way of non-limiting example of one embodiment thereof with reference to the accompanying drawings, in which:

FIGS. 4 and 6 are detailed representations of two circuit blocks of FIG. 3; and

FIGS. 5 and 7 are indicative representations of some signals present at points in the schematic diagrams of FIGS. 4 and 6 respectively.

DETAILED DESCRIPTION OF THE INVENTION

Figure 2:
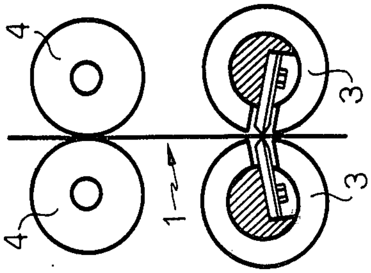
FIG. 2 is a partly sectional indicative side view of the continuous web with the web cutting means and feed means.
Figure 1:
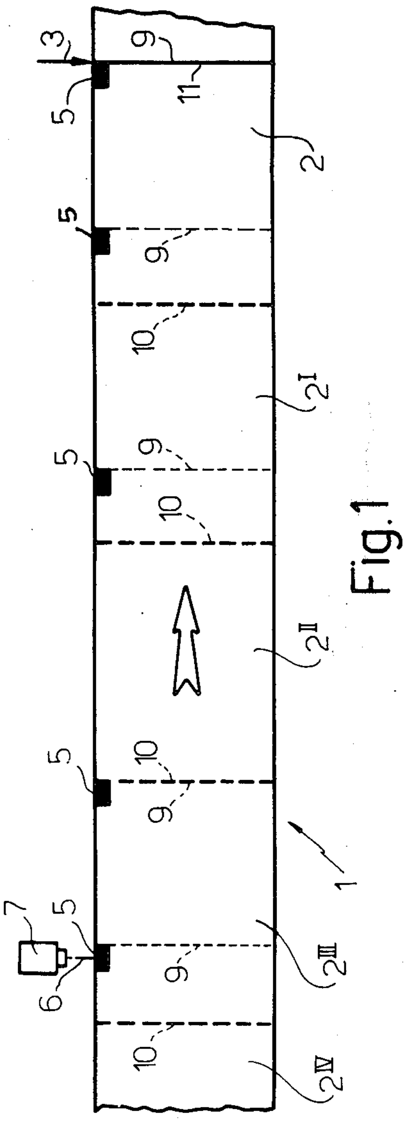
FIG. 1 is an indicative plan view of a continuous web to be cut into portions by the device of the present invention.

With reference to FIGS. 1 and 2, the reference numeral 1 indicates a continuous web which is to be cut into portions 2, $2^{I}$, $2^{II}$, $2^{III}$, $2^{IV}$, . . . , by periodic cutting means 3 of known type constituted by two rotating knives disposed on the two faces of the web 1 (FIG. 2). The web 1 is fed towards the cutting means 3 by feed means 4 of known type, constituted by two drive rollers disposed on the two faces of the web 1. On each portion 2, $2^{I}$, $2^{II}$, $2^{III}$, $2^{IV}$ of the web 1 motifs (not shown) are printed, and reference marks 5 are provided in known manner for detection as they pass into a zone 6, by detection means 7 of known type for example in the form of a photoelectric cell device. In FIG. 1, the reference numeral 9 indicates the predetermined zones on the web 1 in which the portions must be cut in order for their printed motifs to be centred on them. These cutting zones 9 are in a defined position with respect to the reference marks 5.

In FIG. 1, the differences in pitch between the various reference marks of the various portions have been exaggerated for purposes of example.

Again in FIG. 1, the reference numerals 10 indicate the cutting zones which would arise as a consequence of the formation of a first cutting zone 11 if no adjustment operation was carried out on the various successive portions. In the illustrated example of the device according to the present invention, the rotational speed of the periodic cutting means 3 is assumed constant, and said cutting zones 10 are therefore equally spaced along the web 1 (assuming that the length fed for each cycle by the feed means 4 is constant).

Figure 3:
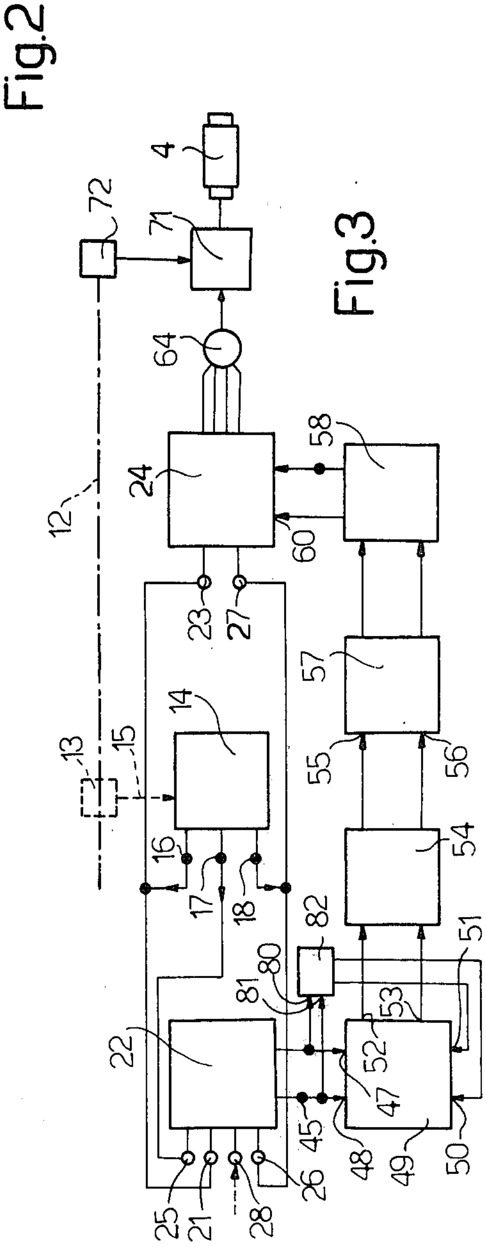
FIG. 3 is a block diagram of the device according to the present invention.

With reference to FIG. 3, the reference numeral 12 indicates a machine shaft, of known type, which is able both to rotate the cutting means 3 and to drive all the various mobile members of a machine with the required motion ratios. This machine can be a machine of known type, for example a cigarette packaging machine. To the shaft 12 there is coupled a device 13 of known type, able to feed to a processing block 14 signals 15 which have a frequency and phase which are related to the speed and phase of rotation of the shaft 12. In particular, the device 13 can comprise toothed discs coupled to the shaft 12, and detector devices of photoelectric, magnetic or other type. The device 13 is able to determine the speed, direction and phase of rotation of the shaft 12 by way of said means. The processing block 14 comprises three output terminals 16, 17 and 18, at which a first, a second and a third signal are present respectively.

The first signal, at the terminal 16, is an activation signal constituted by a two level logic signal, which is a function of two phases of the operating cycle corresponding to the formation of a portion, namely a first phase relative to the checking of the cut and a second phase relative to any required correction. This first phase is substantially centred, with a range of about 120°, about the moment of cutting by said means 3, whereas the second phase is complementary to said first phase within an arc of 360° of the rotation of said cutting means 3. At the terminal 17 a second signal is present which is repeated periodically at each operating cycle for the formation of a portion, and substantially coincides with the moment of cutting by said means 3. The third signal, at the terminal 18, is a pulse signal the frequency of which is a function of the speed of rotation of said cutting means 3, and serves to quantify the cutting error as is explained hereinafter. The third signal therefore comprises a predetermined number of equally spaced pulses for each complete revolution of the cutting means 3. The number of these pulses can for example be 200. The frequency of the third signal is therefore related to the speed of rotation of the shaft 12, and the phases of said first and second signal are related to the phase of rotation of the shaft 12 which rotates the cutting means 3, and are therefore related to the phase (angular position) of the cutting means 3.

The terminal 16 is connected both to a terminal 21 of a first block 22 and to a terminal 23 of a second block 24. The terminal 17 is connected to a terminal 25 of the block 22, and the terminal 18 is connected both to a terminal 26 of the block 22 and to a terminal 27 of the block 24. The output of the detection means 7 is connected to a terminal 28 of the block 22.

Figure 4:
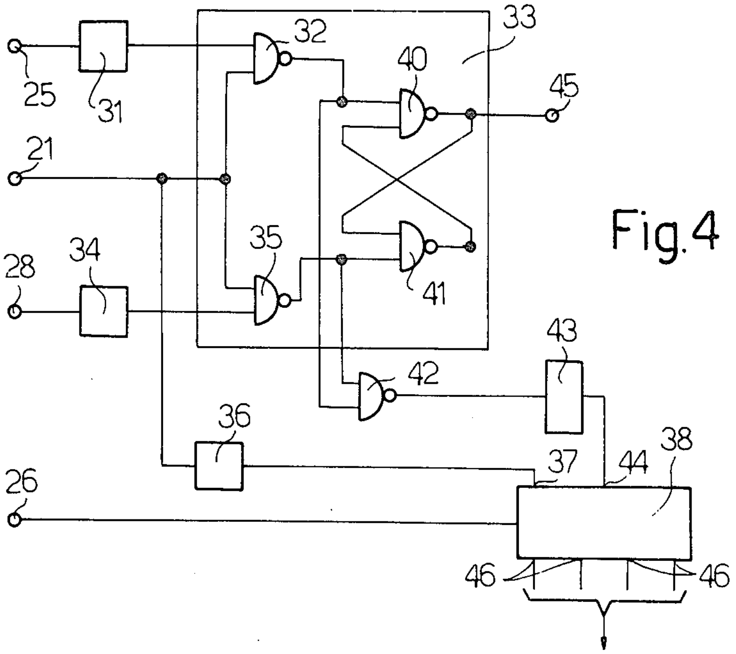

With reference to FIG. 4, which shows the first block 22 in detail, the terminal 25 is connected, by way of a block 31 which provides a rectangular output signal corresponding to the rising front of a signal at its input, to a first input of a double input NAND gate 32, belonging to a block 33 in the form of a priority logic circuit.

The terminal 28 is connected by way of a block 34 similar to the block 31, to an input of another double input NAND gate 35 also belonging to the block 33. The terminal 21 is connected to the other input both of the gate 32 and of the gate 35, and, by way of a block 36 similar to the block 31, to a zeroing input 37 of an increasing binary counter 38. The outputs of the two gates 32 and 35 are fed respectively to two inputs of two NAND gates 40 and 41 and to the two inputs of a NAND gate 42, the output of which is fed to the input of a frequency divider block 43 formed from a J-K flip-flop, the output of which is fed to an activation input 44 of the counter 38. The output of the NAND gate 41 is connected to the other input of the NAND gate 40, the output of which is connected both to the other input of the NAND gate 41, and to an output terminal 45 of the block 33. The terminal 26 is also connected to the input of the counter 38, from which there are four outputs 46 which supply logic signals representative of a number in binary code.

With reference to FIG. 3, the outputs 46 and terminal 45 are connected to inputs 80 and 81 of a block 82 comprising shift registers and to inputs, 47 and 48 respectively, of a block 49 which calculates the algebraic difference between signals which arrive as an absolute value and sign at the inputs 47 and 48 respectively and at inputs 50 and 51 which are connected to the outputs of the block 82, corresponding to the inputs 80 and 81 respectively. The block 49 therefore provides this difference between the two input signals in the form of a value and sign at outputs 52 and 53 respectively, which are fed to a block 54 similar to the block 82 and comprising shift registers, its outputs, for the corresponding input data, being fed to inputs 55 and 56 of a block 57 similar to the block 54, and also being fed, by way of a further block 58 similar to the blocks 57 and 54, respectively to inputs 60 of a decreasing binary counter 61 and to an input 62 of a control circuit 63 of known type, for controlling a stepper motor 64 (see FIG. 6). The terminal 23 is connected, by way of a block 66 similar to the blocks 31, 34 and 36 of FIG. 4, to the activation input 65 of the counter 61 belonging to the block 24, and the terminal 27 is connected both to the input 67 of the counter 61 and to an input of a double input NAND gate 68. The outputs of the counter 61 are connected to the input of an OR gate 69, the output of which is connected to the other input of the gate 68. The output of the gate 68 is fed to a further input 70 of the control circuit 63. The mechanical output of the stepper motor 64 (see FIG. 3) is fed to a mechanical differential 71, to which is also fed the mechanical output of a main motor 72 preferably connected to the shaft 12, and the output of the differential 71 is used to rotate the feed means 4.

The operation of the device described by the present invention is as follows.

With reference to FIG. 1, it will be assumed that the cutting means 3 have made a cut in the cutting zone 11 indicated by the continuous line. Consequently, in the case of the portion $2^{III}$ on which the detection means 7 detect the reference mark 5, if there were no variation in the speed of the cutting means and feed means 4, there would be a cutting zone 10 which was different from the predetermined cutting zone 9.

Figure 5:
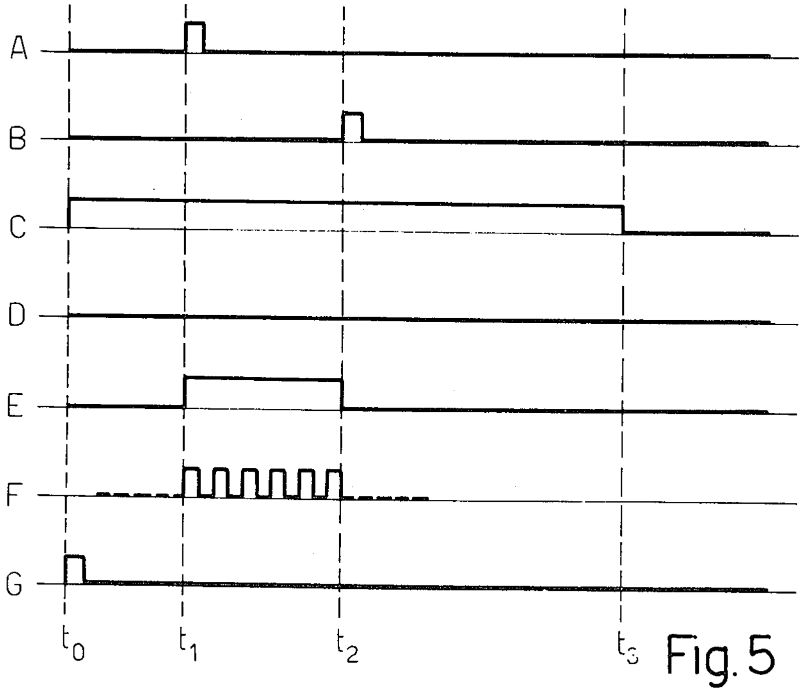

The device of the present invention operates in such a manner as to annul this difference in order to cause the cutting zone 10 to coincide with the cutting zone 9, i.e. with the cut on that portion, when the portion 2 is moved into the position shown. In this respect, with reference to FIGS. 3, 4 and 5, at time $t_o$, the activation signal for the cutting check stage (signal C; stage from $t_o$ to $t_3$) produces, by way of the block 36, a signal G which zeros the counter 38. When at time $t_1$ the reference mark 5 reaches the detection means 7, a signal arises which is fed from the output of the block 34 (signal A) to the block 33 to provide an output signal D (at logic level 0 in the case considered) which is present at the terminal 45, and which indicates that the signal A has reached the block 33 before the signal B. The signal B is obtained from the block 31 at time $t_2$, as the cutting zone 10 passes into the zone 6. The output of block 43 (signal E) is consequently at logic level 1 between times $t_1$ and $t_2$, and over this time interval it therefore activates the counter 38 so that it counts the number of pulses (signal F) which reach it from the terminal 26. This number of pulses appears at the outputs 46 as a number in binary code, and is fed, both in terms of its absolute value and sign, from the outputs 46 and terminal 45 to the inputs 47 and 48 of the block 49 and to the inputs 80 and 81 of the block 82 respectively. This number of pulses, in combination with the sign, therefore quantifies the difference between the position of the predetermined cutting zone 9 and the cutting zone 10 consequent on the operation of the cutting means 3. The signals present at the inputs 47 and 48 which quantify the error between the cutting zones 9 and 10, assuming that the signals at the inputs 50 and 51 are zero, i.e. that the cutting zones 9 and 10 calculated on the preceding portion coincide, are fed to three successive blocks 54, 57 and 58 which delay them each by one portion cutting cycle. After three delay cycles, i.e. when the portion $2^{III}$ has been moved into a position corresponding with the portion 2, the signal C generates the signal H by way of block 66 at time $t_3$ of that cycle (FIGS. 6 and 7), i.e. at the commencement of the correction stage defined by the signal C, and this allows the pulses (signal F) present at the terminal 27 to be loaded into the counter 61. These pulses are loaded until the total number of pulses defined in binary code by the signals present at the inputs 60 is reached, so that at the output of the gate 69 there is a signal (signal L) which activates the gate 68. The signal L is of logic level 1 during the time interval $t_3-t_4$, defined by a number of pulses equal to the number lying in the interval $t_1-t_2$, and this therefore allows a corresponding number of pulses (signal M) to be fed to the input 70 of the control circuit 63. The control circuit 63 causes the position of the stepper motor 64 to vary as a function of the number of pulses received at the input 70 and of the signal at the input 62 which determines the direction, and this, by way of the differential 71, varies the rotational speed of the feed means 4 by an amount corresponding to the difference detected for the portion $2^{III}$ between the cutting zones 9 and 10, and by varying the feed speed of the web 1 in the section preceding the cutting of the portion by the cutting means 3, this difference is annulled so making the cutting zones 9 and 10 coincide. In this manner, with the device according to the present invention, there is the advantage of quantifying the difference between the cutting zones 9 and 10 for each portion, and eliminating this difference for each portion cutting operation. Moreover, the detection means 7 can be disposed at a considerable distance upstream of the cutting means 3, with the assurance that the exact correction necessary for each portion cutting operation will always be obtained. This is attained by means of a corresponding number of shift registers similar to the blocks 54, 57 and 58.

Furthermore, as the error quantification is made by way of the pulses which reach the terminals 26 and 27, any difference in the rotational speed of the cutting means 3 between the time when the reference mark 5 is detected and the cutting of the portion some cycles afterwards has no influence, in that although there is a difference between the respective time intervals $t_1-t_2$ and $t_3-t_4$, the number of pulses lying within these two intervals is always identical. The accuracy of the correction made is also a function of the number of pulses contained within one correction interval, and is therefore greater the higher the pulse frequency. The effective correction accuracy which can be obtained is also a function of the number of steps of the stepper motor 64.

As can be seen from FIG. 3, the block 49 takes the difference between the detected error signals for two successive portions, so that if these two portions have the same difference, both in terms of absolute value and sign, between the cutting zones 9 and 10, no variation in the stepper motor 64 takes place between the first and second portion. In this respect, if for example it is assumed that for the portion 2 the difference between the cutting zones 9 and 10 corresponds to 10 pulses within the interval $t_1-t_2$, and it is assumed that this difference between the cutting zones is also the same for the portion $2^{I}$, there will be identical values at the inputs 50 and 51 corresponding to the difference between the zones 9 and 10 of the portion 2, and at the inputs 47 and 48 corresponding to the zones 9 and 10 of the portion $2^{I}$, so that at the outputs 52 and 53, corresponding to the correction values for the portion $2^{I}$ relative to the portion 2, there will be respective values which indicate a zero variation. Thus, if for the portion $2^{II}$ the cutting zones 9 and 10 coincide, the successive signals at the outputs 52 and 53 for the portion $2^{II}$ will be equal and opposite to those for the portion 2, so as to return the cutting zones 9 and 10 to coincidence.

Finally, it is apparent that modifications can be made to the described embodiment of the device according to the present invention which do not leave the scope of the inventive idea. In particular, instead of keeping the speed of the cutting means 3 constant, and controlling the rotation of the feed means 4 by the differential 71, the opposite could be done, or alternatively both the cutting means 3 and the feed means 4 could be simultaneously controlled. Moreover, the number of blocks 54, 57 and 58 could be different, provided this number is related to the number of portions preceding that on which the reading is made by the detection means 7. Again, the stepper motor 64 could be controlled by the error value for each portion instead of being controlled by the error difference between two successive portions. Finally, said periodic cutting means and/or said feed means for the web could be operated intermittently instead of continuously, so that the pulse signal at the terminal 18 could be a function of the frequency of operation, or more generally of the duration of the operating cycle of said means, rather than of the speed.

What we claim is:

1. A device for feeding and adjusting a continuous web and for cutting it into portions, said portions to be cut in a predetermined zone on said web, said device comprising means for periodically cutting in accordance with operational cycles which correspond to the formation of a portion of said web, means for feeding said web to said cutting means, and means for detecting at least one reference mark for said zone on said web, comprising first means for checking the position of said predetermined cutting zone relative to a cutting zone consequent on the action of said cutting means and to quantify any diversity between said two zones, and second means for controlling and correcting said any diversity relative to each portion cutting operation, arranged to directly or indirectly receive signals from said first means as a function of said any diversity, and to act on at least one of said feed means and said cutting means in order to eliminate said any diversity relative to each portion cutting operation, and wherein said first means comprise logic circuits and a binary code increasing counter and receive at least one first signal indicative of said cutting zone consequent on the operation of said cutting means, and one second signal indicative of said predetermined cutting zone, and are arranged to supply from said counter and from said circuits a third and fourth signal which indicate said any diversity between said two zones in terms of its absolute value relative to a predetermined quantification unit and in terms of its sign respectively, said predetermined quantification unit being a function of a pulse signal which reaches said first means, and of which the frequency is a function of the duration of the operating cycle of at least one of said periodic cutting means and said feed means for said web; and wherein said second control and correction means comprise a binary code decreasing counter and logic circuits which receive at least said third and said fourth signal, or a pair of signals homogeneous with said third and fourth signal, and said pulse signal.

2. A device as claimed in claim 1, wherein
delay means are disposed between said first means and said second means in order to delay the feed of said signals which are a function of said any diversity, by a number of operational cutting cycles corresponding to the number of portions preceding that on which, in one cycle, said reference sign is detected by said detection means.

3. A device as claimed in claim 2, wherein said delay means comprise shift registers.

4. A device as claimed in claim 1,
comprising a circuit disposed between said first means and said second means to supply an indication of the variation, between two successive portions, of said any diversity relative to each portion cutting operation.

5. A device as claimed in claim 4,
wherein said circuit receives two pairs of said third and fourth signal relative to two successive portions, and supplies a pair of signals homogeneous with said third and fourth signal and equal to their algebraic difference.

6. A device as claimed in claim 1, wherein said second means comprise a stepper motor controlled as a function of said third and fourth signal or of said signals homogeneous with said third and fourth signal, and arranged to influence at least one of said feed means and said cutting means by way of a differential, in order to eliminate said any diversity relative to each portion cutting operation.

7. A device as claimed in claim 1,
comprising means for supplying an activation signal as a function of said operating cycle, said activation signal acting on said first means in order to activate them during a first phase, and on said second means in order to activate them during a second phase.

8. A device as claimed in claim 1,
wherein said cutting means comprise at least one rotary knife, that said feed means comprise at least one drive roller, and that said detection means comprise a photoelectric cell device.

* * * * *